(12) United States Patent
Yoon

(10) Patent No.: US 11,479,894 B2
(45) Date of Patent: Oct. 25, 2022

(54) METHOD AND APPARATUS FOR COMPENSATING VIBRATION OF DEEP-LEARNING BASED WASHING MACHINE

(71) Applicant: LG ELECTRONICS INC., Seoul (KR)

(72) Inventor: Hyounghwa Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 563 days.

(21) Appl. No.: 16/560,878

(22) Filed: Sep. 4, 2019

(65) Prior Publication Data

US 2020/0063315 A1    Feb. 27, 2020

(30) Foreign Application Priority Data

Aug. 15, 2019    (KR) .................... 10-2019-0099965

(51) Int. Cl.
| | |
|---|---|
| *D06F 33/48* | (2020.01) |
| *G06K 9/62* | (2022.01) |
| *G06T 7/20* | (2017.01) |
| *G06N 3/08* | (2006.01) |
| *G06T 7/70* | (2017.01) |

(52) U.S. Cl.
CPC ........... *D06F 33/48* (2020.02); *G06K 9/6256* (2013.01); *G06K 9/6262* (2013.01); *G06N 3/08* (2013.01); *G06T 7/20* (2013.01); *G06T 7/70* (2017.01); *G06T 2207/30204* (2013.01)

(58) Field of Classification Search
None
See application file for complete search history.

(56) References Cited

U.S. PATENT DOCUMENTS

| | | | |
|---|---|---|---|
| 2019/0276967 A1* | 9/2019 | Sakata | .............. D06F 33/48 |
| 2021/0025097 A1* | 1/2021 | Lee | .............. H04N 7/188 |

* cited by examiner

*Primary Examiner* — Leon Flores
(74) *Attorney, Agent, or Firm* — Lee, Hong, Degerman, Kang & Waimey PC

(57) ABSTRACT

Provided are a method and an apparatus for analyzing a vibration of a deep-learning based washing machine. In the method for analyzing a vibration of a deep-learning based washing machine according to an embodiment of the present invention, a washing tub of the washing machine includes a specific shape pattern, an artificial neural network model is learned from a video image obtained by photographing the shape pattern through a camera and a vibration value sensed through the vibration sensor, and thus, by using the artificial neural network model, it is possible to predict a vibration value of the washing machine using the camera of the washing machine even without a vibration sensor. According to the present invention, a smart washing machine without the vibration sensor such as 6-axis gyro sensor can be implemented. The AI device of the present invention can be associated with an unmanned aerial vehicle (UAV), a robot, an augmented reality (AR) device, a virtual reality (VR) device, and a device related to a 5G service.

20 Claims, 15 Drawing Sheets

METHOD AND APPARATUS FOR COMPENSATING VIBRATION OF DEEP-LEARNING BASED WASHING MACHINE

CROSS-REFERENCE TO RELATED APPLICATIONS

Pursuant to 35 U.S.C. § 119(a), this application claims the benefit of earlier filing date and right of priority to Korean Patent Application No. 10-2019-0099965, filed on Aug. 15, 2019, the contents of which are hereby incorporated by reference herein in its entirety.

BACKGROUND OF THE INVENTION

Field of the Invention

The present invention relates to a method and an apparatus for analyzing a vibration of a deep-learning based washing machine, and particularly, a method and an apparatus for analyzing vibration of a deep-learning based washing machine capable of predicting a vibration value from an image through a camera.

Related Art

In general, a washing machine refers to various devices for treating fabrics by applying physical and/or chemical action to laundry such as clothes and bedding. The washing machine includes an outer tub which stores washing water and an inner tub which stores the fabrics and is rotatably installed in the in the outer tub. In general, a washing method by the washing machine includes a washing process of rotating the inner tub to wash the fabrics and a dewatering process of dewatering the fabrics using a centrifugal force of an inner tub.

When the washing machine is operated, vibration are generated according to an operation of a motor. In this case, an accurate prediction of the vibration can be used as an importance evidence related to the operation of the washing machine to determine whether to enter an operation of a next step through an increase in RPM of a washing tub or determine whether to stop a current step and perform restart.

In a washing machine of the related art, in order to measure the vibration value, a method of obtaining control information based on a voltage and a current or sensing the vibration value through a 6-axis gyro sensor.

SUMMARY OF THE INVENTION

The present invention aims to achieve the above-described needs and/or to solve the above-described problems.

The present invention provides a method and an apparatus for analyzing vibration of a deep-learning based washing machine which does not include a separate vibration sensor.

The present invention also provides a method for analyzing vibration of a deep-learning based washing machine capable of predicting a more accurate vibration value of a washing machine based on deep-learning.

Moreover, the present invention also provides a method for analyzing vibration of a deep-learning based washing machine capable of analyzing a vibration cause of a washing machine based on a predicted vibration value.

In an aspect, a method for analyzing a vibration of a deep-learning based washing machine is provided. The method includes acquiring a vibration value through a vibration sensor of the washing machine, acquiring a moving image of a marker marked on a washing tub, through a camera of the washing machine, sampling learning data from the image and the vibration value, and learning a first artificial neural network model by setting the sampled learning data to input data and setting the vibration value acquired through the vibration sensor of the washing machine to output data. The maker is photographed in a band shape when the maker rotates and a thickness is different according to the vibration value.

The method may further include: learning a second artificial neural network model by setting the vibration value to the input data and setting information on a vibration cause of the washing machine to the output data; and generating a vibration analysis model which combines the first artificial neural network model and the second artificial neural network model with each other and analyzes the vibration of the washing.

The method may further include: sampling analysis data for analyzing the vibration of the washing machine from the image of the marker; setting the sampled analysis data to input data of the first artificial neural network model; and predicting the vibration value of the washing machine based on an output value of the first artificial neural network model.

The method may further include: setting the predicted vibration value to input data of the second artificial neural network model when the vibration value is equal or more than a preset threshold value; and determining a cause of the vibration of the washing machine based on an output value of the second artificial neural network model.

The method may further include: compensating the predicted vibration value using an autoencoder.

The marker may be formed inside the washing tub of the washing machine by at least one of attachment, painting, and molding.

The marker may have a shape constituted by a combination of one or more arcs having different lengths based on one origin.

The method may further include: inputting an evaluation data to the first artificial neural network model or the second artificial neural network model; and determining accuracy of the vibration analysis model based on an output value of the first artificial neural network model or the second artificial neural network model.

The method may further include: performing relearning when accuracy of the vibration analysis model is less than a preset threshold value.

The method may further include: displaying the cause of the vibration through a display.

The marker may include two or more combination of the arcs.

In another aspect, an AI device for analyzing a vibration of a deep-learning based washing machine is provided. The AI device includes: a receiver; an AI processor; and a memory. The AI processor samples learning data form a vibration value acquired through a vibration sensor of the washing machine and a moving image of a marker marked on the washing tub acquired through a camera of the washing machine, the AI processor learns a first artificial neural network model by setting the sampled learning data to input data and setting the vibration value acquired through the vibration sensor of the washing machine to output data, the memory stores the first artificial neural network model, and the marker is photographed in a band shape when the marker rotates and a thickness of the band is different according to the vibration value.

In another aspect, a smart washing machine is provided, the machine includes: a washing tub; a camera which photographs the washing tub; a marker portion which is provided in the washing tub; and an AI device which includes an which generates a first artificial neural network model for predicting a vibration value of the washing machine from an image of a rotating marker acquired through the camera and a vibration value acquired through the vibration sensor. The marker portion is photographed in a band shape when the marker portion rotates, and a thickness of the band is different according to the vibration value.

BRIEF DESCRIPTION OF THE DRAWINGS

The accompanying drawings, which are included as part of the detailed description to help understand the present invention, provide an embodiment of the present invention. In addition, the drawings show the technical features of the present invention together with the detailed description.

Figure 1:
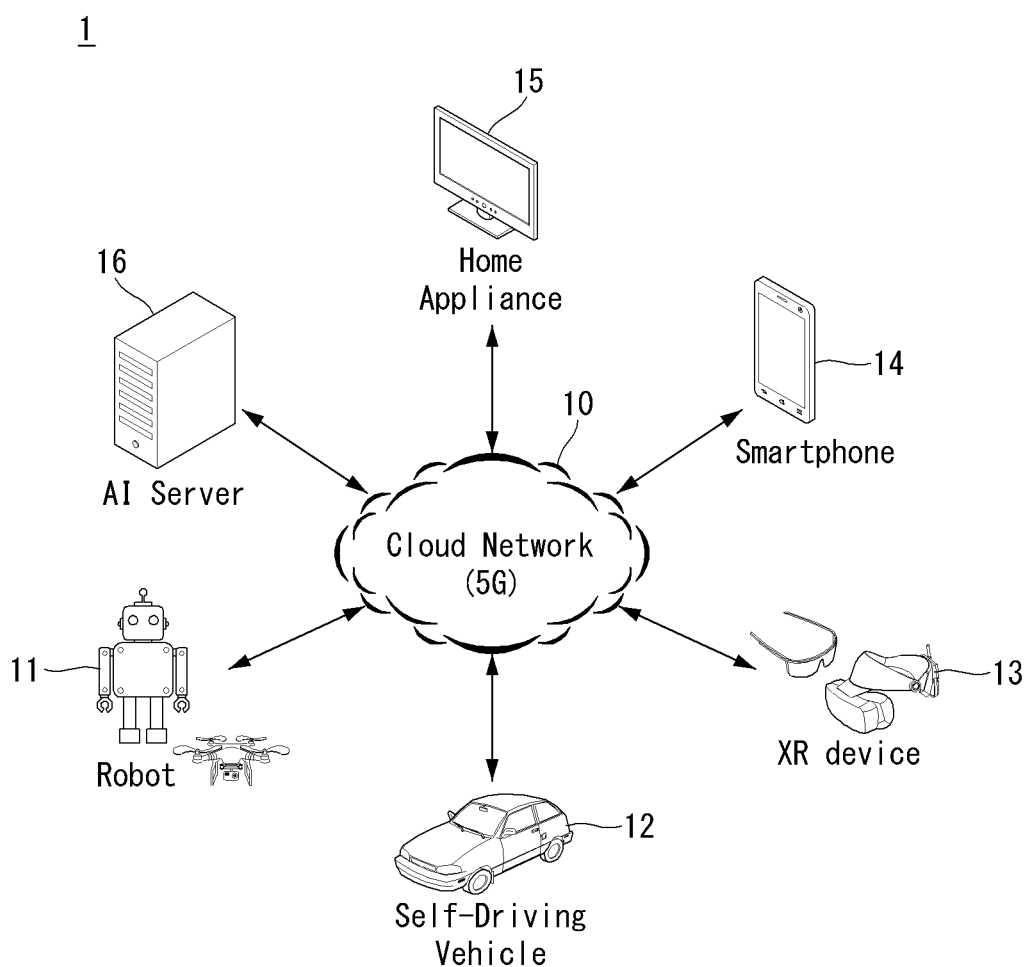
FIG. 1 illustrates one embodiment of an AI device.

The accompanying drawings, which are included as a part of detailed descriptions to aid understanding of the present invention, provide an embodiment of the present invention and, together with the detailed description, explain technical features of the present invention.

DESCRIPTION OF EXEMPLARY EMBODIMENTS

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present invention to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Atonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+rRobot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HIVID), Head-Up Display (HUD), mobile phone, tablet PC, laptop computer, desktop computer, TV, digital signage, and so on, where a device employing the XR technology may be called an XR device.

Hereinafter, 5G communication (5th generation mobile communication) required by an apparatus requiring AI processed information and/or an AI processor will be described through paragraphs A through G.

A. Example of Block Diagram of UE and 5G Network

Figure 2:
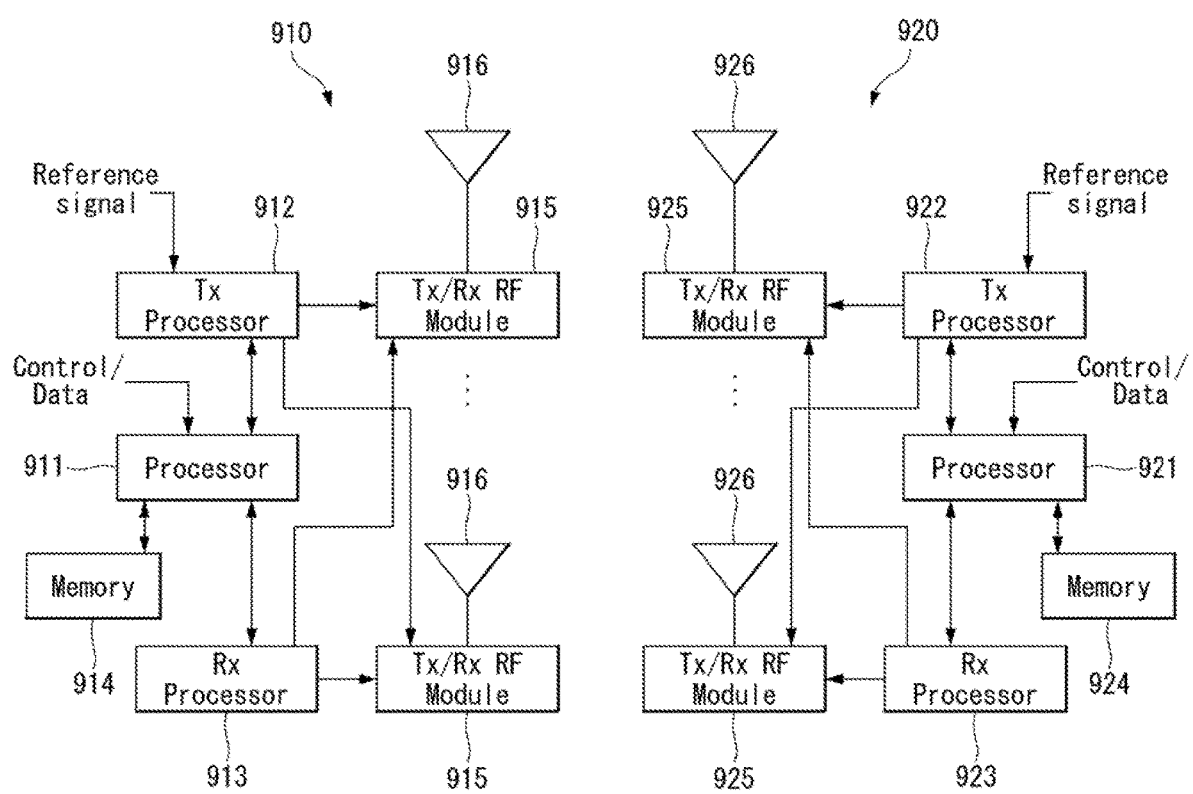
FIG. 2 illustrates a block diagram of a wireless communication system to which the methods proposed herein may be applied.

FIG. 2 is a block diagram of a wireless communication system to which methods proposed in the disclosure are applicable.

Referring to FIG. 2, a device (autonomous device) including an autonomous module is defined as a first communication device (910 of FIG. 2), and a processor 911 can perform detailed autonomous operations.

A 5G network including another vehicle communicating with the autonomous device is defined as a second communication device (920 of FIG. 2), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HIVID may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
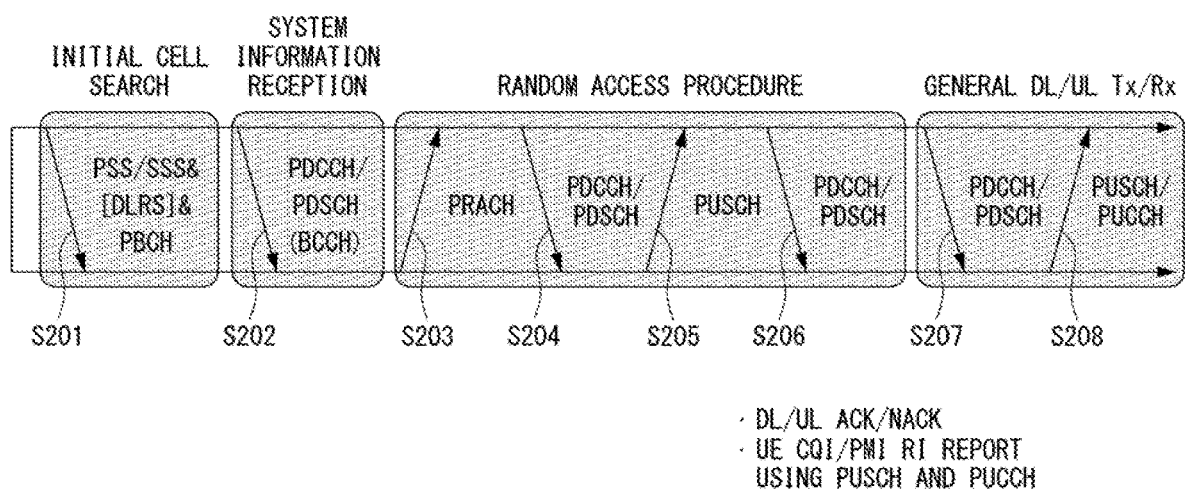
FIG. 3 illustrates an example of a signal transmission/reception method in a wireless communication system.

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationlnfo is set for SRS resources, the same beamforming as that used for the SSB, CSI-RS or SRS is applied. However, when SRS-SpatialRelationlnfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI using 5G Communication

Figure 4:
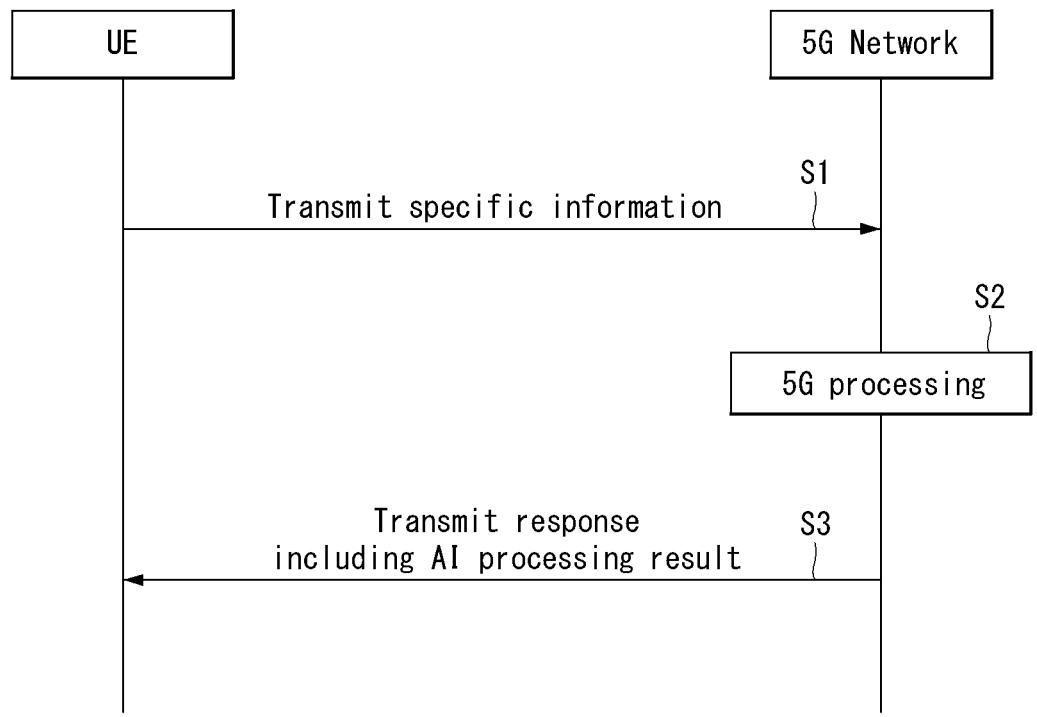
FIG. 4 illustrates an example of basic operations of a user terminal and a 5G network in a 5G communication system.

FIG. 4 shows an example of basic operations of a UE and a 5G network in a 5G communication system.

The UE transmits specific information to the 5G network (S1). In addition, the 5G network can determine whether to remotely control the vehicle (S2). Here, the 5G network may include a server or a module which performs remote control related to autonomous driving. In addition, the 5G network can transmit information (or signal) related to remote control to the UE (S3).

G. Applied Operations between UE and 5G Network in 5G Communication System

Hereinafter, the operation of an using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S and S3 of FIG. 4, the UE performs an initial access procedure and a random access procedure with the 5G network prior to step S1 of FIG. 4 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, information (or a signal) related to remote control on the basis of the DL grant.

Next, a basic procedure of an applied operation to which a method proposed by the present invention which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present invention which will be described later and mMTC of 5G communication are applied will be described.

Description will focus on parts in the steps of FIG. 4 which are changed according to application of mMTC.

In step S1 of FIG. 4, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 5:
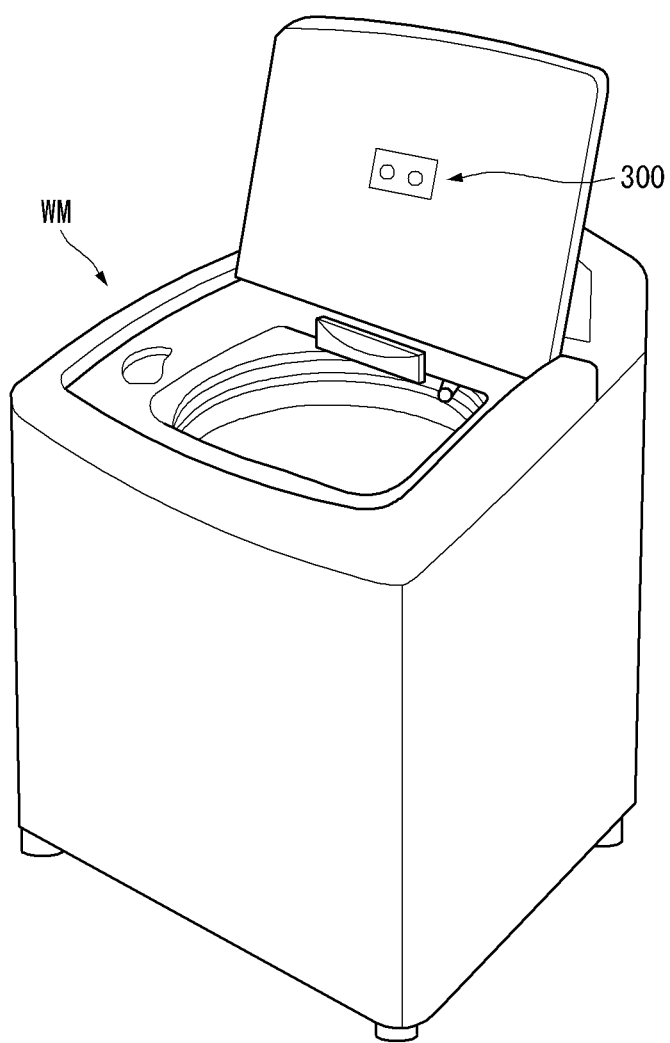
FIG. 5 is a view showing a device according to an embodiment of the present invention.
Figure 6:
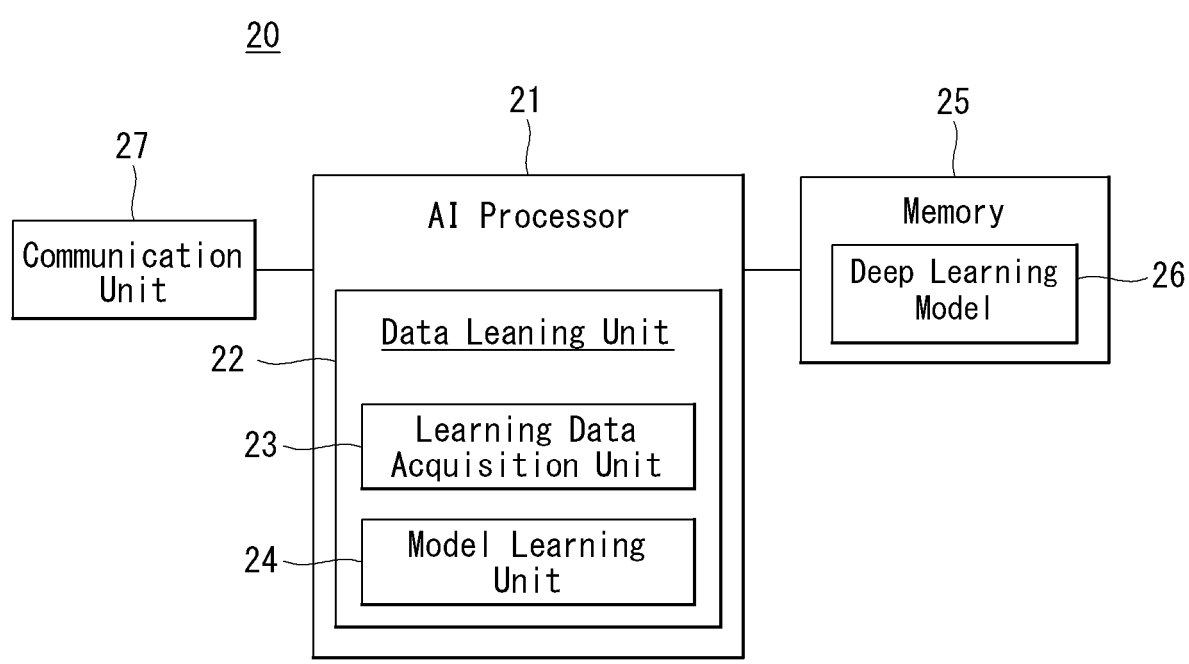
FIG. 6 is a block diagram of an AI device according to an embodiment of the present invention.
Figure 7:
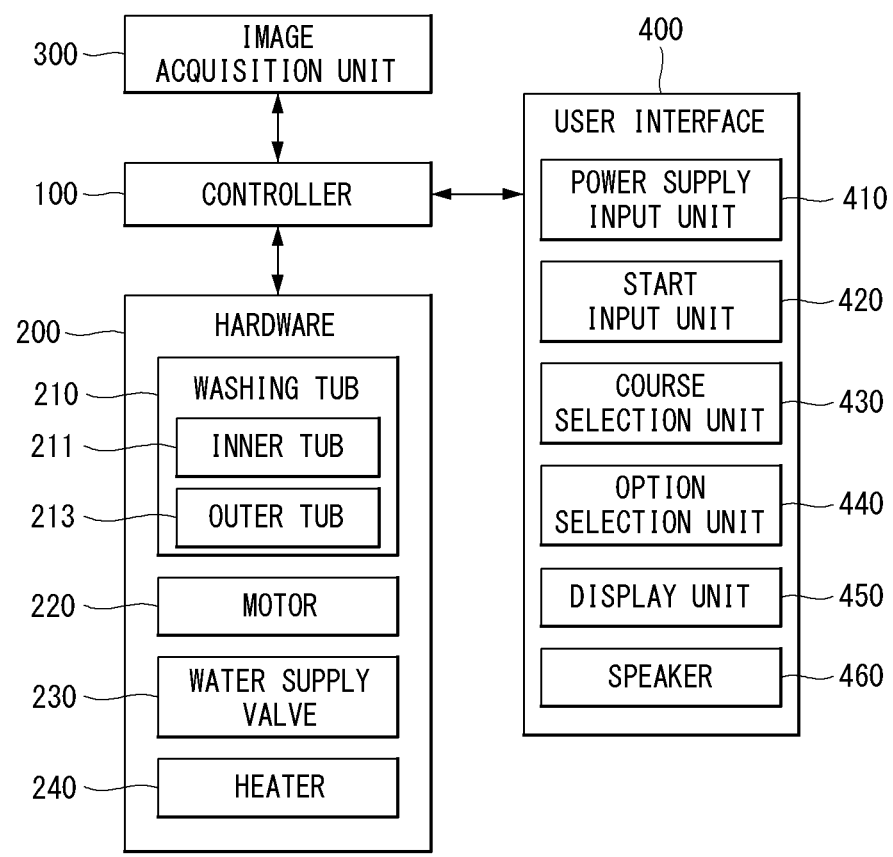
FIG. 7 is a block diagram of a smart washing machine according to an embodiment of the present invention.

FIG. 5 is a view showing an intelligent washing machine according to an embodiment of the present invention. FIG. 6 is a block diagram showing main configurations of the washing machine shown in FIG. 5.

With reference to FIGS. 5 and 6, a washing machine 10 according to an embodiment of the present invention includes a controller 100, a hardware 200, an image acquisition unit 300, and a user interface 400.

The controller 100 controls the hardware 200 according to information input through the user interface 400, and thus, controls an overall driving of the washing machine 10. In addition, the controller 100 controls an operation of the hardware 200 based on a laundry image acquired through the image acquisition unit 300. More specifically, the controller 100 acquires fabric classification information or fabric distribution information from a laundry image and controls an operation of the hardware 200 based on the fabric classification information or the fabric distribution information. The fabric classification information may be information on a type, a material, or the like of the laundry, and, particularly, may refer to moisture content information of the laundry. The fabric distribution information may refer to information on placement or a height of the laundry disposed in the inner tub 211.

The controller 100 learns the fabric classification information, predicts vibration of the inner tub 211 which may be generated in a dewatering process, and can change a RPM of a motor 220 in the dewatering process according to the vibration of the inner tub (211). For example, it is determined that the laundry may be cut off according to the fabric classification information, the controller 100 performs the control such that the RPM of the motor 220 decreases in the dewatering process.

The hardware 200 may include a washing tube, the motor 220, a water supply valve 230, a heater 240, or the like.

The washing tube 210 includes an outer tub 213 which stores washing water, and an inner tub 211 which is disposed inside the outer tub 213 to dispose the laundry and is rotated using a turning force supplied from the motor 220. The water supply valve 230 controls a supply of the washing water. The heater heats the water supplied to the washing tub. In addition, a marker portion (not shown) for predicting a rotational speed of the motor 220 is provided inside the washing tub 210, the marker portion may be marked on a rotating plate or provided on the washing tub 210, or may be formed to be marked inside the washing tub 210.

The image acquisition unit 300 acquires an image of the laundry disposed in the inner tub 211 or an image of the marker portion (not shown) provided inside the washing tub 210. The image acquisition unit 300 may use at least one of a 2D camera and a 3D camera and may be disposed on a cover of the washing machine 10.

The user interface 400 may include a power supply input unit includes a power supply input unit 410, a start input unit 420, a course selection unit 430, an option selection unit 440, a display unit 450, and a speaker 460.

The power supply input unit 410 provides means for controlling ON/OFF of a main power supply of the washing machine. The start input unit 420 provides means for controlling a start of a washing process, a rinsing process, the dewatering process, or the like. The course selection unit 430 provides means capable of selecting a type of the washing process, the rinsing process, or the dewatering process. The option selection unit 440 provides means capable of selecting detail options for performing the washing process, the rinsing process, or the dewatering process. For example, the option selection unit 440 may be means for selecting options of a water temperature, a time, a reservation, and the like. The display unit 450 may display an operating status of the washing machine 10, or may display course information selected by the user through the course selection unit 430, option information selected by the user through the option selection unit 440, or the like. The speaker 460 outputs the operation status of the washing machine 10 or a situation with respect to a specific event thereof as a voice signal. The specific event may be a fabric distribution control based on the fabric image, or a control and situation of the RPM.

FIG. 6 is a block diagram of an AI device according to an embodiment of the present invention.

The AI device 20 may include an electronic device having an AI module capable of AI processing, a server including the AI module, or the like. Moreover, the AI device 20 may be included in the device 10 shown in FIG. 5 as a least a part and provided to execute at least a portion of the AI processing together.

The AI processing may include all operations related to the control of the device 10 shown in FIG. 5. For example, an autonomous vehicle may perform the AI processing on sensing data or driver data and may perform processing/determination operation and a control signal generation operation. Moreover, for example, the autonomous vehicle may perform the AI processing on data acquired through an interaction with other electronic devices provided in the vehicle so as to perform an autonomous traveling control.

The AI device 20 may include an AI processor 21, a memory 25 and/or a communication unit 27.

The AI device 20 is a computing device capable of learning a neural network and may be implemented as various electronic devices such as a server, a desktop PC, a notebook PC, or a tablet PC.

The AI processor 21 can learn the neural network using a program stored in the memory 25. Particularly, the AI processor can learn the neural network for recognizing device-related data. Here, the neural network for recognizing the device-related data may be designed to simulate a human brain on a computer and may include a plurality of weighted network nodes which simulate neurons of a human neural network. The plurality of network modes may transmit and receive data according to a connection relationship so that the neurons simulate synaptic activity of the neurons that send and receive signals through synapses. Here, the neural network may include a deep-learning model developed from a neural network model. In the deep-learning model, the plurality of network nodes may be located at different layers and may transmit or receive data according to a convolutional connection relationship. An example of the neural network model includes various deep-learning techniques such as deep neural networks (DNN), convolutional deep neural networks (CNN), a Recurrent Boltzmann Machine (RNN), a Restricted Boltzmann Machine (RBM), deep belief networks (DBN), or a Deep Q-Network, and can be applied to a computer vision, voice recognition, natural language processing, voice/signal processing, or the like.

Meanwhile, the processor which performs the above-described function may be a general purpose processor (for example, CPU), but may be an AI dedicated processor (for example, a GPU) for artificial intelligence learning.

The memory 25 may store various programs and data necessary for an operation of the AI device 20. The memory 25 may be implemented as a nonvolatile memory, a volatile memory, a flash memory, a hard disk drive (HDD), a solid state drive (SDD), or the like. The memory 25 is accessed by the AI processor 21, and reading/writing/modifying/deleting/update of data by the AI processor 21 may be executed. In addition, the memory 25 may store a neural network model (for example, a deep-learning model 26) generated through a learning algorithm for classification/recognition of data according to an embodiment of the present invention.

Meanwhile, the AI processor 21 may include a data learning unit 22 which learns a neural network for classifying/recognizing data. The data learning unit 22 can learn a criteria as to which learning data to use to determine classification/recognition of the data, and can learn a criteria about how to classify and recognize data using learning data. The data learning unit 22 may learn the deep-learning model by acquiring the learning data to be used for learning and applying the acquired learning data to the deep-learning model.

The data learning unit 22 may be manufactured in a form of at least one hardware chip and mounted on the AI device 20. For example, the data learning unit 22 may be manufactured in a form of a dedicated hardware chip for artificial intelligence (AI), or may be manufactured as a portion of a general purpose processor (CPU) or a graphic dedicated processor (GPU) and mounted on the AI device 20. In addition, the data learning unit 22 may be implemented as a software module. When the data learning unit 22 is implemented as a software module (or program module including instruction), the software module may be stored in a computer readable non-transitory computer readable media. In this case, at least one software module may be provided by an operating system (OS) or may be provided by an application.

The data learning unit 22 may include a learning data acquisition unit 23 and a model learning unit 24.

The learning data acquisition unit 23 can acquire learning data required for the neural network model to classify and recognize data. For example, the learning data acquisition data can acquire vehicle data and/or sample data which is input to the neural network model as the learning data.

The model learning unit 24 can learn using the acquired learning data so that the neural network model has a determination criteria about how to classify predetermined data. In this case, the model learning unit 24 can cause the neural network model to learn, through supervised learning using at least a portion of the learning data as the determination criteria. Alternatively, the model learning unit 24 self-learns using the learning data without guidance, and thus, can cause the neural network model to learn through unsupervised learning finding the determination criteria. Moreover, the model learning unit 24 can cause the neural network model to learn, through reinforcement learning using a feedback which determines whether a result of a situation determination according to the learning is correct. In addition, the model learning unit can cause the neural network to learn, using a learning algorithm including error back-propagation or gradient decent.

If the neural network model is learned, the model learning unit 24 can store the learned neural network model in a memory. The model learning unit 24 may store the learned neural network model in a memory of a server connected to the AI device 20 in a wire network or a wireless network.

The data learning unit 22 may further include a learning data preprocessing unit (not shown) and a learning data selection unit (not shown) so as to improve a analysis result of a recognition model or save a resource or time required for generating the recognition model.

The learning data preprocessing unit can preprocess the acquired data so that the acquired data can be used in learning for determining a situation. For example, the learning data preprocessing unit can process the acquired data into a preset format so that the model learning unit 24 can use the learning data acquired for learning to recognize an image.

Moreover, the learning data selection unit can select data required for the learning of the learning data acquired by the learning data acquisition unit 23 and the learning data preprocessed by the preprocessing unit. The selected learning data may be provided to the model learning unit 24. For example, the learning data selection unit detects a specific region among images acquired by a camera in the vehicle, and thus, can select data with respect to only an object included in the specific region as the learning data.

In addition, the data learning unit 22 may further include a model evaluation unit (not shown) to improve the analysis result of the neural network model.

The model evaluation unit may input evaluation data into the neural network model, and allow the model learning unit 24 to relearn when the analysis result output from the evaluation data does not satisfy a predetermined criteria. In this case, the evaluation data may be predefined data for evaluating the recognition model. For example, the model evaluation unit may evaluate that the predetermined criteria are not satisfied when the number or ratio of the evaluation data whose analysis result is not accurate among the analysis results of the learned recognition model for the evaluation data exceeds a predetermined threshold value.

The communication unit 27 may transmit an AI processing result by the AI processor 21 to an external electronic device.

Here, the external electronic device may be defined as an autonomous vehicle. Moreover, the AI device 20 may be defined as another vehicle or 5G network which communicates with the autonomous driving module vehicle. Meanwhile, the AI device 20 may be implemented to be functionally embedded in an autonomous driving module provided in the vehicle. In addition, the 5G network may include a server or a module which performs an autonomous driving related control.

Meanwhile, the AI device 20 shown in FIG. 6 is described to be functionally divided into the AI processor 21, the memory 25, the communication unit 27, or the like. However, note that the above-mentioned components may be integrated into one module and may be called as an AI module.

The above-described 5G communication technology may be applied in combination with methods proposed in the present invention to be described later, or may be supplemented to specify or clarify the technical features of the methods proposed in the present invention.

Figure 8A:
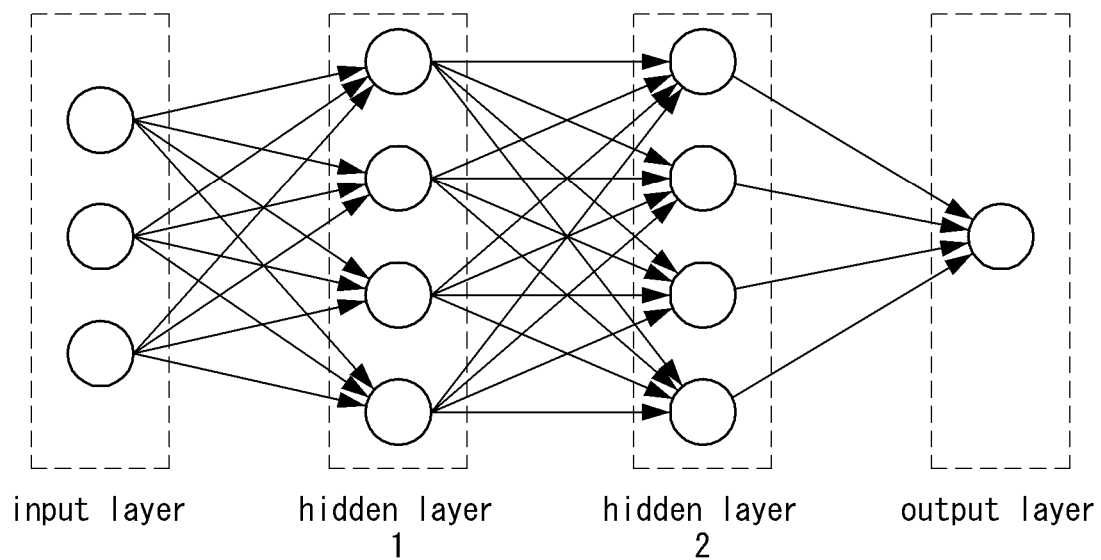
FIGS. 8A and 8B are diagrams showing an artificial neural network according to an embodiment of the present invention.
Figure 8B:
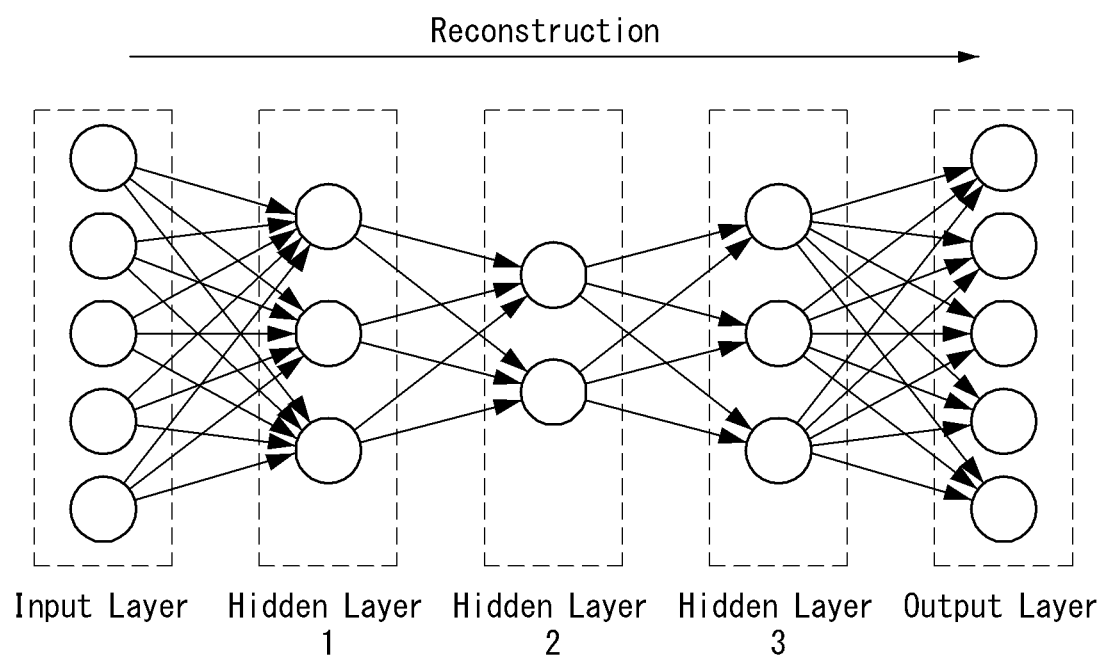

FIGS. 8A and 8B are diagrams showing an artificial neural network according to an embodiment of the present invention.

Specifically, FIG. 8A is a diagram showing a general structure of the artificial neural network and FIG. 8B is a diagram showing an autoencoder of the artificial neural network which executes decoding after encoding and undergoes a reconstruction step.

In general, the artificial neural network includes an input layer, a hidden layer, and an output layer, and neutrons included in each layer may be connected to each other through weights. The artificial neural network can have a shape capable of approximating a complex function through linear coupling of the weights and neuron values and a nonlinear activation function. A purpose of the artificial neural network learning is to find the weight which minimizes a difference between an output computed at the output layer and an actual output.

A deep neural network may mean an artificial neural network including several hidden layers between the input layer and the output layer. By using many hidden layers, complex nonlinear relationships can be modeled. A neural network structure that enables advanced abstraction by increasing the number of layers is referred to as deep-learning. The deep-learning learns a very large amount of data, and thus, when new data is input, it is possible to choose the highest possible answer based on a learning result. Therefore, the deep-learning can operate adaptively according to an input, and can automatically find a characteristic factor in a process of learning a model based on data.

The deep-learning based model may include various deep-learning techniques such as the deep neural networks (DNN), the convolutional deep neural networks (CNN), the Recurrent Boltzmann Machine (RNN), the Restricted Boltzmann Machine (RBM), the deep belief networks (DBN), or the Deep Q-Network described above in FIG. 6, Various deep-learning techniques. However, the deep-learning based model is not limited thereto. In addition, the deep-learning based model may include machine learning methods other than the deep-learning. For example, a feature of input data may be extracted by applying the deep-learning based model, and a machine learning based model may be applied when classifying or recognizing the input data based on the extracted feature. The machine learning based model may include a support vector machine (SVM), AdaBoost, or the like, but is not limited thereto.

With reference to FIG. 8A, the artificial neural network according to an embodiment of the present invention may include an input layer, hidden layers, an output layer, and a weight. For example, FIG. 8A shows a structure of the artificial neural network in which a size of the input layer is 3, a size of each of a first hidden layer and a second hidden layer is 4, and a size of the output layer is 1. Specifically, the neurons included in the hidden layer may be connected to the neurons included in the input layer by linear coupling of individual weights included in the weight. The neurons included in the outer layer may be connected to the neurons included in the hidden layer by linear coupling of the individual weights included in the weight. Moreover, the artificial neural network can find minimization of a difference between an output calculated by the output layer and an actual output.

Moreover, the artificial neural network according to an embodiment of the present invention may have an artificial neural network structure in which the size of the input layer is 10, the size of the output layer is 4, and the size of the hidden layer is not limited. In this case, data, which is determined as learning data based on data related to the operation of the washing machine 10, is input to the input layer.

With reference to FIG. 8B, the artificial neural network according to an embodiment of the present invention may include the autoencoder. The encoder is an artificial neural network, which inputs original data to the artificial neural network to encode the data and uses a certain difference between reconstruction data and the input data generated by decoding the encoded data to reconstruct the data. For example, the autoencoder may have a structure in which the size of the input layer and the size of the output layer respectively are 5 to be the same as each other, the size of a first hidden layer is 3, the size of a second hidden layer is 2, and the size of a third hidden layer is 3. Accordingly, the number of nodes of the hidden layers gradually decreases toward an intermediate layer and gradually increases toward the outer layer. The autoencoder shown in FIG. 8B is an exemplary diagram and thus, an embodiment of the present invention is not limited thereto. The autoencoder compares an input value of the original data with an output value of the reconstruction data, and thus, the autoencoder may determine that the data is not learned if a difference therebetween is large and may determine that the data is already learned. Therefore, it is possible to increase reliability of the data using the autoencoder. In addition, the autoencoder may be used as compensation means for removing a noise of an input signal.

In this case, a mean square error (MSE) may be used as a method of comparing the input value with the output value. The data may be determined as data which is not learned as the mean squared error value increases, and the data may be determined as data which is already learned as the mean squared error value decreases.

Figure 9A:
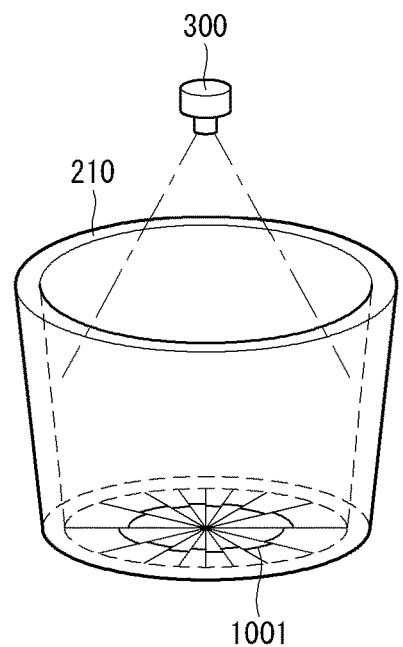
FIGS. 9A and 9B are diagrams showing a method of photographing a washing tub according to an embodiment of the present invention.
Figure 9B:
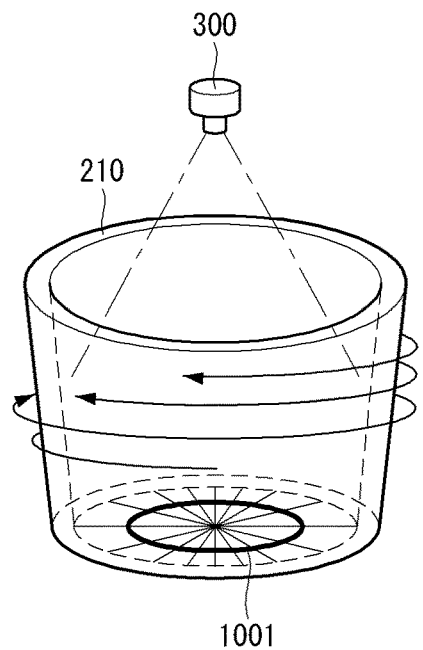
Figure 10A:
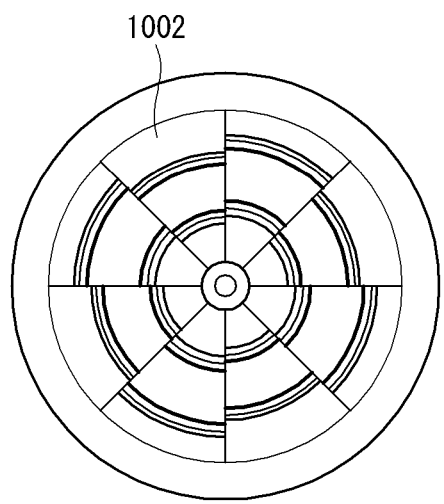
FIGS. 10A and 10B are examples of a marker portion provided in a washing machine according to an embodiment of the present invention.
Figure 10B:
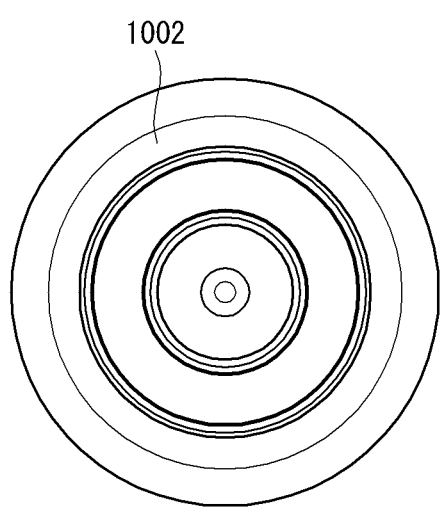

FIGS. 9A and 9B are diagrams showing a method of photographing a washing tub according to an embodiment of the present invention, and FIGS. 10A and 10B are examples of a marker portion provided in a washing machine according to an embodiment of the present invention.

With reference to FIGS. 9A and 9B, a shape constituted by a combination of one or more arcs having different radii may be formed around an origin in the washing tub 210. As shown in FIGS. 9A and 9B, marker portions 1001 and 1002 having this shape may be formed inside the washing tub 210, and as shown in FIGS. 10A and 10B, after the marker portion is marked on a separate rotating plate, the rotating plate may be connected to the washing tub 210.

The shapes of the marker portions 1001 and 1002 are not limited to the embodiment shown in the drawings and may have various shapes. The shapes of the marker portions 1001 and 1002 may have different thicknesses of bands displayed at the time of rotation according to a rotational speed. Accordingly, the shape of each of the marker portions 1001 and 1002 is not a perfect circular shape, but is a shape in which the radius length from the origin changes. The shapes having varying radial lengths from the origin may have different thicknesses of the bands formed when rotating, depending on the rotational speed. In addition, as shown in FIGS. 10A and 10B, the marker portions 1001 and 1002 may be formed such that two or more bands may be formed.

The image acquisition unit 300 may acquire images of the marker portions 1001 and 1002 formed in the washing tub 210 as well as the laundry inside the washing tub 210. In this case, the image of each of the marker portions 1001 and 1002 for which the marker portions 1001 and 1002 are to be photographed is not only a still image but may also be a moving image while the washing machine 10 is operated. A moving image as discussed may include data captured during operation of the washing machine, including a video file, multiple still images comprising a video, multiple still images taken at particular time intervals, a single still image taken and processed from a moving image, and the like. While the washing machine 10 is operated, the marker portions 1001 and 1002 provided in the washing tub 210 are rotated, and in this case, a band-shaped image may be acquired. In this case, the image acquisition unit 300 may appropriately adjust a photographing frame rate according to the rotational speed of the washing tub 210.

Figure 11:
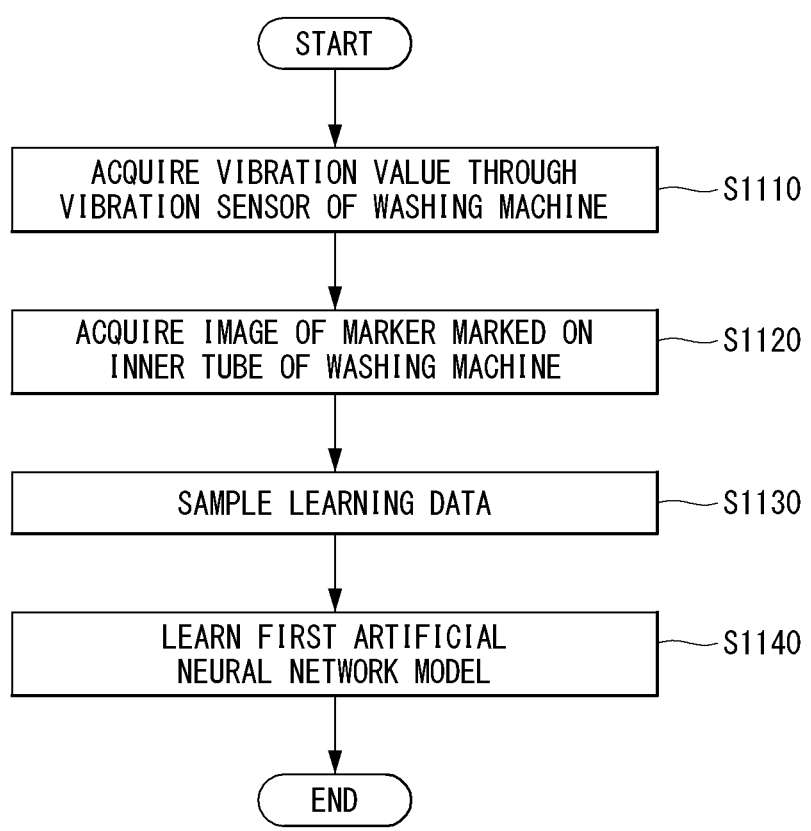
FIG. 11 is a flow chart showing a learning method of an artificial neural network model for predicting washing machine vibration according to an embodiment of the present invention.
Figure 12:
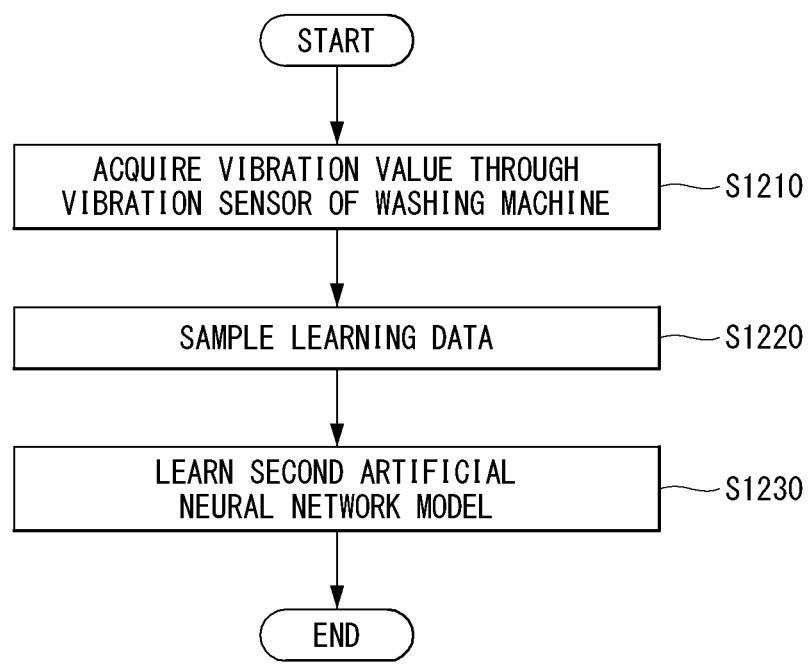
FIG. 12 is a flow chart showing a learning method of an artificial neural network model determining a washing machine vibration cause according to a washing machine vibration value of an embodiment of the present invention.

FIG. 11 is a flow chart showing a learning method of an artificial neural network model for predicting washing machine vibration according to an embodiment of the present invention, and FIG. 12 is a flow chart showing a learning method of an artificial neural network model determining a washing machine vibration cause according to a washing machine vibration.

Specifically, FIG. 11 is a flow chart showing a learning method of a first artificial neural network model.

First, the working machine 10 can acquire a vibration value through a vibration sensor of the washing machine 10 while the washing machine 10 is operated (S1110).

A vibration and noise may be generated while the washing machine 10 is operated. As a method of detecting the vibration, there are a method of measuring the vibration based on a voltage and current applied to a motor of the washing machine 10 and a method of detecting the vibration using a 6-axis gyro sensor. In an embodiment of the present invention, the vibration sensor means the 6-axis gyro sensor. However, the vibration sensor is not limited thereto, and may include known means capable of detecting the vibration of the washing machine 10.

Thereafter, the washing machine 10 can acquire the images of the marker portions 1001 and 1002 marked inside the washing machine, through the image acquisition unit 300 (S1120).

In this case, the image acquisition unit 300 can photograph an inside of the washing tub 210, and can check a status of the laundry by photographing the laundry. Moreover, the image acquisition unit 300 can acquire the images of the marker portions 1001 and 1002 marked on the inside of the washing tub 210. In this case, the image acquired by the image acquisition unit 300 includes not only the still image but also the moving image. A thickness of the band in the moving image is different according to the rotational speed of the washing tub 210. The image acquisition unit 300 may be set to appropriately set the photographing frame rate and appropriately acquire the band shape in the moving image.

Thereafter, the AI device 20 of the washing image 10 can sample the learning data (S1130).

The AI device 20 can sample data applied to the input layer and the output layer of the artificial neural network based on the vibration value acquired through the vibration sensor and moving image information acquired through the image acquisition unit 300. A method of sampling the data can use a known technique.

Thereafter, the AI device 20 of the washing machine 10 can train the first artificial neural network model (S1140).

The training of the first artificial neural network model is realized by a method of applying the vibration data acquired through the vibration sensor is applied to the output layer and the rotating image information acquired through the image acquisition unit 300 is applied to the input layer. In this case, in order to evaluate the learned artificial neural network model, by inputting evaluation data to the first artificial neural network model and acquiring an output value, it can be determined whether the evaluation is within a preset error range. In a case where accuracy of the first artificial neural network model is outside the error range, the first artificial neural network model may be returned to the learning step. In this case, the learning method may be realized by the unsupervised learning.

Specifically, FIG. 12 is a flow chart showing a learning method of a second artificial neural network model.

First, the washing machine 10 can acquire the vibration value through the vibration sensor (S1213).

Therefore, the AI device 20 of the washing machine 10 can sample the learning data of the artificial neural network from the vibration value acquired from the vibration sensor and a vibration cause corresponding to a constant vibration value (S1220). In this case, the method of sampling the learning data is the same as the method described in FIG. 11.

The second artificial neural network model can be learned, which applies the vibration data acquired through the vibration sensor to the input layer, applies vibration cause information to the output layer, and determines the vibration cause according to the input of each vibration value. In this case, in order to evaluate the learned artificial neural network model, by inputting evaluation data to the second artificial neural network model and acquiring an output value, it can be determined whether the evaluation is within a preset error range. In a case where accuracy of the second artificial neural network model is outside the error range, the second artificial neural network model may be returned to the learning step. In this case, the learning method may be realized by the unsupervised learning.

Figure 13:
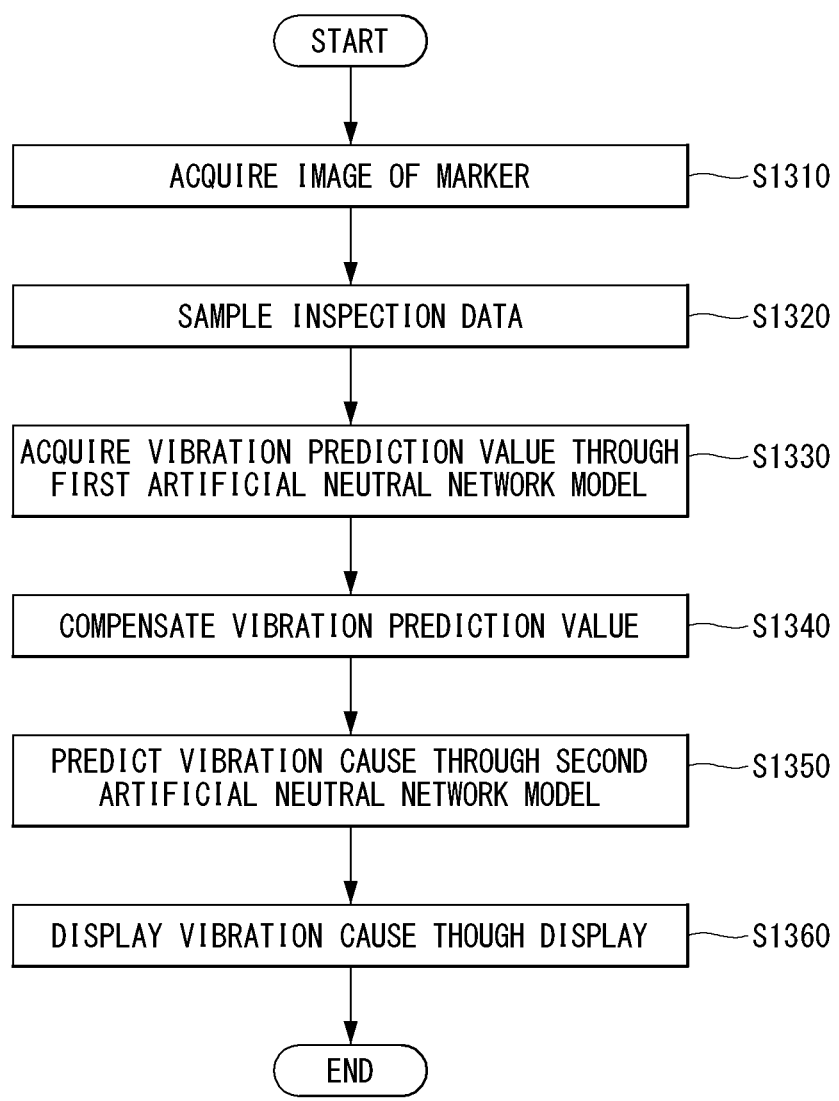
FIG. 13 is a flow chart showing a method of analyzing the washing machine vibration according to an embodiment of the present invention.

FIG. 13 is a flow chart showing a method of analyzing the washing machine vibration according to an embodiment of the present invention.

First, the image acquisition unit 300 of the washing machine 10 can acquire the images of the marker portions 1001 and 1002 (S1310).

In this case, the image acquisition unit 300 of the washing machine 10 can acquire images of the laundry inside the washing tub 210 and the images of the marker portions 1001 and 1002, including moving images. When the laundry is included inside the washing tub 210, it is difficult to distinguish the laundry and the marker portions 1001 and 1002, and thus, it is difficult to acquire appropriate images of the marker portions 1001 and 1002. Accordingly, the marker portions 1001 and 1002 can have various shapes to acquire an appropriate image of a photographing unit. For example, when the washing tub 210 rotates at a high speed, the laundry may be located at an outer side of the washing tub 210 and the marker portions may be easily photographed at a position near the center of the washing tub 210. In this case, it is possible to prevent the disturbance of the laundry by placing the shapes of the marker portions 1001 and 1002 at a position at which a vision obstruction is not generated by the laundry. In various embodiments of the present invention, the shapes of the marker portions 1001 and 1002 may include at least one of an oval shape, a rectangular shape, a rhombic shape, a spiral shape, a wavy shape, or a shape constituted by a combination of one or more arcs having different lengths based on the same origin.

Thereafter, the AI device 20 of the washing machine 10 can sample inspection data (S1320).

Specifically, the inspection data to be applied to the input layer of the first artificial neural network model can be sampled from the images of the marker portions 1001 and 1002 acquired through the image acquisition unit 300.

Thereafter, the AI device 20 of the washing machine 10 may acquire a vibration predictor value through the first artificial neural network model (S1330).

The sampled inspection data is applied to the input layer of the first artificial neural network model, and based on an output value of the first artificial neural network model, it is possible to acquire a vibration prediction value corresponding to the output value. The washing machine 10 according to the embodiment of the present invention can predict the vibration value of the washing machine 10 through the first artificial neural network model, and may include a separate vibration sensor only during the design and production stages of the washing machine product. After the design and production states, during commercial sale of the washing machine product, since the washing machine 10 may be preloaded with the learned values for the neural networks, the products which are actually sold may not need to include the vibration sensor, thus there is an advantage of producing a washing machine product capable of predicting an accurate vibration value while saving cost for each unit produced.

Thereafter, it is possible to compensate for the vibration prediction value by the AI device 20 (S1340).

In some cases, the vibration value acquired using the first artificial neural network model has a slight error, thus a vibration compensation unit (not shown) may compensate the vibration prediction value. The vibration compensation unit can use the autoencoder. The autoencoder can cause the same learning data to learn by applying the same learning data to the input layer and the output layer. It is possible to remove the noise of the inspection noise or appropriately compensate an output value of the first artificial neural network model using the autoencoder.

Thereafter, the AI device 20 of the washing machine 10 can predict the vibration cause through the second artificial neural network model (S1350).

The second artificial neural network model can determine the vibration cause of the washing machine 10 according to vibration data applied to the input layer. For example, it is possible to classify the vibration value into at least one preset range and predict an expected vibration cause corresponding to each range. The vibration cause may include an imbalance in an installation state of the washing machine 10, aging or failure of the washing machine 10, or the like. Moreover, the failure of the washing machine 10 may include an imbalance of the washing tub 210, a malfunction of a motor, or the like.

In various embodiments of the present invention, the prediction of the vibration cause through the second artificial neural network model can be executed when the vibration value predicted through the first artificial neural network model exceeds a preset threshold value. For example, when the vibration value predicted through the first artificial neural network model is out of a normal operation range, it is possible to analyze the vibration cause through the second artificial neural network model.

Thereafter, the display unit 450 of the washing machine 10 can display the vibration cause on an outside (S1360).

Figure 14:
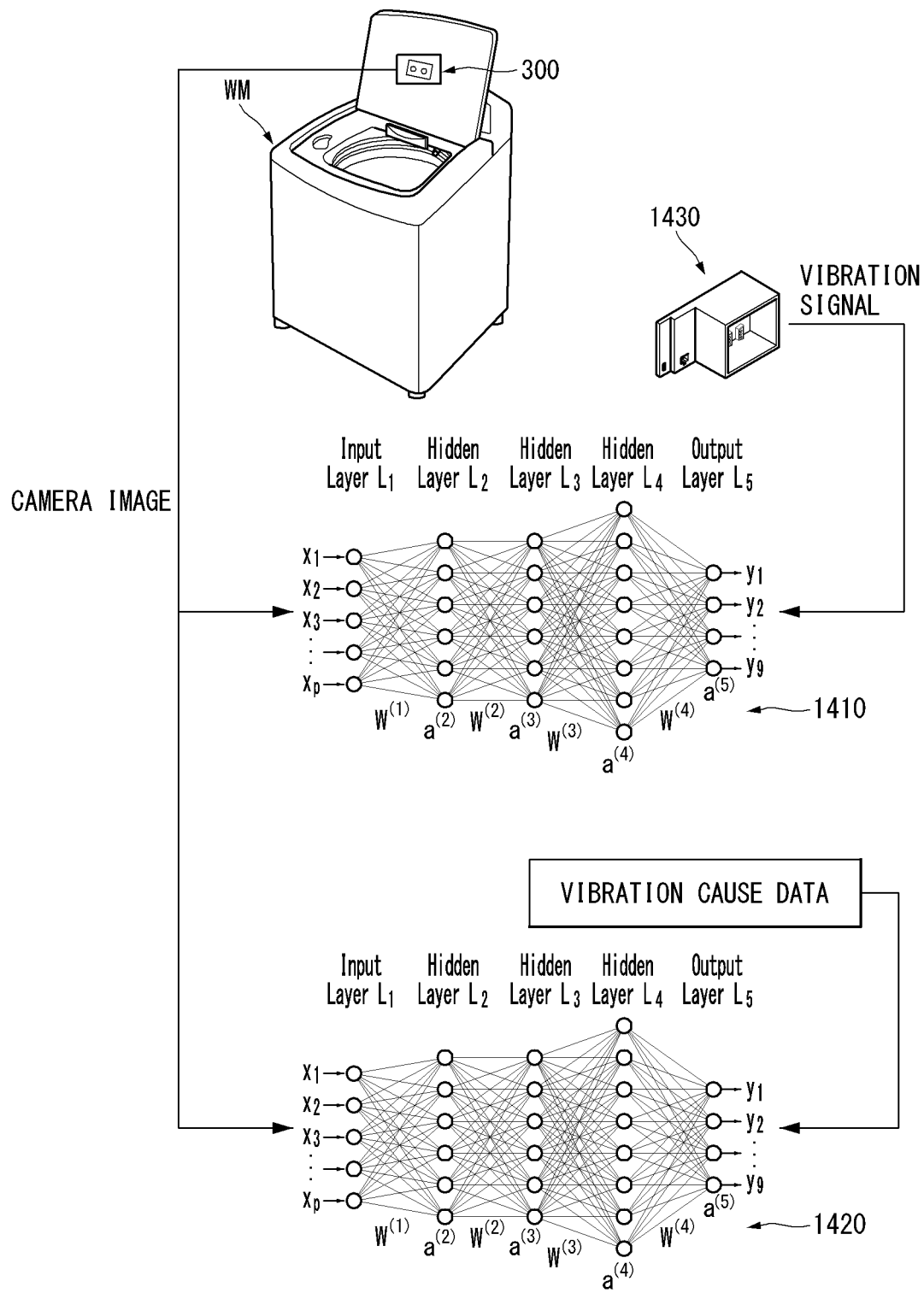
FIG. 14 is a diagram showing the learning method of the artificial neural network model according to an embodiment of the present invention.
Figure 15:
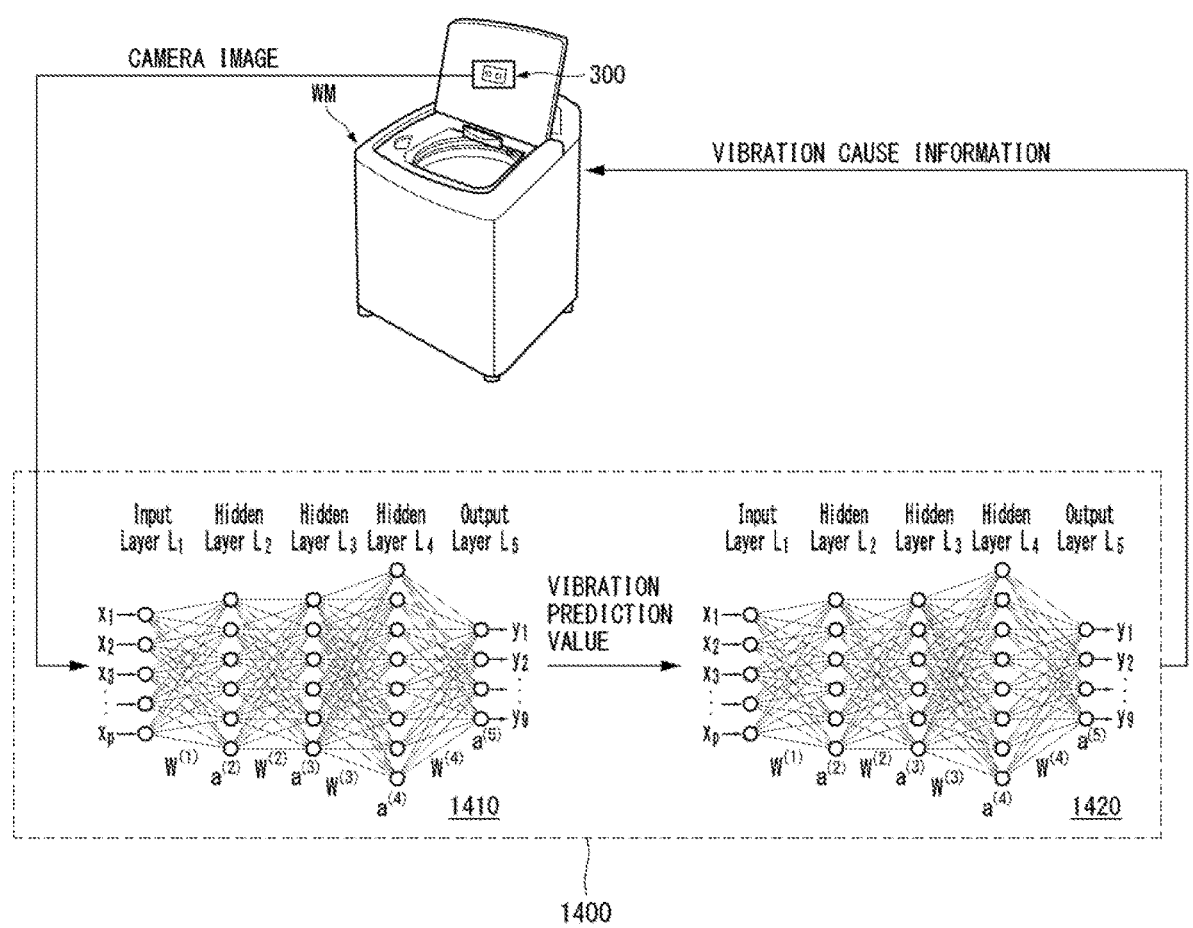
FIG. 15 is a diagram showing a method for analyzing the washing machine vibration according to an embodiment of the present invention.

FIG. 14 is a diagram showing the learning method of the artificial neural network model according to an embodiment of the present invention, and FIG. 15 is a diagram showing a method for analyzing the washing machine vibration according to an embodiment of the present invention.

With reference to FIG. 14, in the learning step of the artificial neural network model, it is possible to use the image acquisition unit, the vibration sensor, and the AI device.

Camera image data acquired through the image acquisition unit 300 of the washing machine 10 can be transmitted to the input layer of the first artificial neural network model 1410 and the second neural network model 1420, and vibration signal data acquired through the vibration sensor of the washing machine 10 can be transmitted to the output layer of the first artificial neural network model 1410. Moreover, vibration cause data is applied to the second artificial neural network model 1420 when the washing machine 10 is designed. In various embodiments of the present invention, the AI device 20 of the washing machine 10 receives the vibration cause data from a server, applies the received vibration cause data to the output layer of the second artificial neural network model 1420, and can continuously update the second artificial neural network model 1420 related to the vibration cause.

With reference to FIG. 15, in a vibration analysis step of the washing machine 10, the image acquisition unit 300 and the AI device 20 can be used.

The camera image data acquired through the image acquisition unit 300 of the washing machine 10 can be transmitted to the input layer of the first artificial neural network. Thereafter, the vibration prediction value output from the first artificial neural network model 1410 can be applied to the input layer of the second artificial neural network model 1420. The AI device 20 of the washing machine 10 can determine the vibration cause of the washing machine 10 according to the output value of the second artificial neural network model 1420.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

Effects of the method for analyzing the vibration of the deep-learning based washing machine according to an embodiment of the present invention are as follows.

According to the present invention, the deep-learning based washing machine which does not include the separate vibration sensor can be implemented.

According to the present invention, it is possible to predict the more accurate vibration value of the washing machine than that obtained by the prediction method of the vibration value through the vibration sensor.

According to the present invention, it is possible to analyze the vibration cause of the washing machine based on the predicted vibration value.

Effects obtained by the present invention are not limited to the effects mentioned above, and other effects that are not mentioned will be apparent to a person skilled in the art from the following detailed description of the invention.

What is claimed is:

1. A method for analyzing a vibration of an artificial intelligence enabled washing machine, the method comprising:
    acquiring a measured vibration value through a vibration sensor of the artificial intelligence enabled washing machine;
    acquiring an image of a marker on a washing tub of the artificial intelligence enabled washing machine through a camera of the artificial intelligence enabled washing machine;
    sampling training data including the image and the vibration value; and
    training a first artificial neural network by inputting the sampled training data as input data and setting the measured vibration value acquired through the vibration sensor as output data,
    wherein the marker appears in the image as a band shape as the washing tub rotates during operation of the artificial intelligence enabled washing machine and a thickness of the band shape is different according to the measured vibration value.

2. The method of claim 1, further comprising:
    training a second artificial neural network by inputting the measured vibration value as input data and setting vibration cause information of the artificial intelligence enabled washing machine corresponding to the measured vibration value as output data; and
    generating a vibration analysis model which combines the first artificial neural network and the second artificial neural network for analyzing a cause of the vibration of the artificial intelligence enabled washing machine.

3. The method of claim 2, further comprising:
    sampling analysis data for analyzing the vibration of the artificial intelligence enabled washing machine from the image of the marker;
    inputting the sampled analysis data to the first artificial neural network as input data; and
    obtaining a predicted vibration value of the artificial intelligence enabled washing machine based on an output of the first artificial neural network.

4. The method of claim 3, further comprising:
    inputting the predicted vibration value to the second artificial neural network as input data when the predicted vibration value is greater than or equal to a preset threshold value; and
    determining a cause of the vibration of the artificial intelligence enabled washing machine based on an output value of the second artificial neural network.

5. The method of claim 3, further comprising compensating the predicted vibration value using an autoencoder.

6. The method of claim 4, further comprising displaying the determined cause of the vibration through a display.

7. The method of claim 2, further comprising:
    inputting an evaluation data to the first artificial neural network or the second artificial neural network; and
    determining an accuracy of the vibration analysis model based on an output value of the first artificial neural network or the second artificial neural network.

8. The method of claim 7, further comprising performing re-training of the first or the second artificial neural network when the determined accuracy of the vibration analysis model is less than a preset threshold value.

9. The method of claim 1, wherein the marker is located inside the washing tub of the artificial intelligence enabled washing machine by at least one of attachment, painting, or molding.

10. The method of claim 1, wherein the marker comprises one or more arcs having different lengths, wherein each of the one or more arcs has a same center.

11. The method of claim 10, wherein the marker includes two or more arcs having different lengths.

12. An artificial intelligence (AI) enabled device for analyzing a vibration of a washing machine, the AI enabled device comprising:
    a memory; and
    an AI processor configured to:
    sample training data including a measured vibration value acquired through a vibration sensor of the washing machine and an image of a marker on a washing tub of the washing machine acquired through a camera of the washing machine;
    train a first artificial neural network by inputting the sampled training data as input data and setting the vibration value acquired through the vibration sensor as output data; and
    store the first artificial neural network in the memory,
    wherein the marker appears in the image as a band shape as the washing tub rotates during operation of the washing machine and a thickness of the band shape is different according to the measured vibration value.

13. The AI enabled device of claim 12, wherein the AI processor is further configured to:
    train a second artificial neural network by inputting the measured vibration value as input data and setting vibration cause information of the washing machine as output data;
    generate a vibration analysis model which combines the first artificial neural network and the second artificial neural network for analyzing a cause of the vibration of the washing machine; and
    store the generated vibration analysis model in the memory.

14. A smart washing machine, comprising:
a washing tub;
a camera configured to capture an image of the washing tub;
a marker located inside the washing tub; and
an artificial intelligence (AI) enabled device comprising an AI processor configured to:
generate a trained first artificial neural network for predicting vibration values of the smart washing machine based on training data comprising an image of the marker captured by the camera while the washing tub is rotating and a corresponding measured vibration value acquired through the vibration sensor, wherein:
the marker appears in the captured image as a band shape as the washing tub rotates; and
a thickness of the band shape is different according to the measured vibration value.

15. The smart washing machine of claim 14, wherein the AI processor of the AI device is further configured to:
generate a trained second artificial neural network for determining a cause of vibration of the smart washing machine based on a measured vibration value acquired through the vibration sensor and vibration cause information of the smart washing machine corresponding to the measured vibration value.

16. The smart washing machine of claim 15, wherein the AI processor of the AI device is further configured to:
sample analysis data for analyzing a vibration of the smart washing machine including the image of the marker,
input the sampled analysis data to the first artificial neural network as input data; and
obtain a predicted vibration value of the smart washing machine based on an output of the first artificial neural network.

17. The smart washing machine of claim 15, wherein the AI processor of the AI device is further configured to input the predicted vibration value to the second artificial neural network as input data and determine a cause of the vibration of the smart washing machine based on an output value of the second artificial neural network.

18. The smart washing machine of claim 17, further comprising a display, wherein the display displays the determined cause of the vibration.

19. The smart washing machine of claim 14, wherein the marker portion is located inside the washing tub of the smart washing machine by at least one of attachment, painting, or molding.

20. The smart washing machine of claim 14, further comprising a rotating plate including the marker, wherein the rotating plate is located at the washing tub of the smart washing machine.

* * * * *